(12) United States Patent
Marshall et al.

(10) Patent No.: US 7,641,866 B2
(45) Date of Patent: Jan. 5, 2010

(54) MULTI-STATION REACTION APPARATUS

(75) Inventors: Louis Anthony Marshall, Shoeburyness (GB); Ian Douglas Waldie, Billericay (GB)

(73) Assignee: Electrothermal Engineering Ltd., Southend-on-Sea, Essex (GB)

( * ) Notice: Subject to any disclaimer, the term of this patent is extended or adjusted under 35 U.S.C. 154(b) by 401 days.

(21) Appl. No.: 10/558,972

(22) PCT Filed: May 26, 2004

(86) PCT No.: PCT/GB2004/002265

§ 371 (c)(1),
(2), (4) Date: Dec. 7, 2006

(87) PCT Pub. No.: WO2004/105934

PCT Pub. Date: Dec. 9, 2004

(65) Prior Publication Data

US 2007/0098603 A1 May 3, 2007

(30) Foreign Application Priority Data

May 30, 2003 (GB) ................................ 0312462.5

(51) Int. Cl.
*B01J 19/00* (2006.01)
*B01L 9/00* (2006.01)

(52) U.S. Cl. ........................ 422/130; 422/198; 422/103; 422/104

(58) Field of Classification Search ................. 422/198, 422/130, 62, 103, 104
See application file for complete search history.

(56) References Cited

U.S. PATENT DOCUMENTS 4,950,608 A * 8/1990 Kishimoto .................. 422/102
5,824,886 A 10/1998 Miller et al.
6,988,546 B1 * 1/2006 Ohki .......................... 165/263
2002/0172629 A1 11/2002 Krumbach et al.

FOREIGN PATENT DOCUMENTS

WO WO 99/13988 3/1999
WO WO 02/46774 6/2002

OTHER PUBLICATIONS

PCT International Search Report (dated Jul. 9, 2004)—International Application No. PCT/GB2004/002265—International Filing Date: May 26, 2004 (12 pages).

* cited by examiner

*Primary Examiner*—Walter D Griffin
*Assistant Examiner*—Lessanework Seifu
(74) *Attorney, Agent, or Firm*—Blakely, Sokoloff, Taylor & Zafman, LLP

(57) ABSTRACT

In a multi-station reaction apparatus (1) comprising an annular heat transfer block (30) formed with a plurality of cavities (31) for receiving respective reaction vessels (36), the upper surface of the heat transfer block (30) has a central recess (32) around which the said plurality of cavities (31) are arrayed. The apparatus further comprises a removable cooling module (4), the central recess (32) of the heat transfer block (30) being shaped so as to accommodate the removable cooling module (4) and corresponding surfaces of the central recess (32) of the heat transfer block (30) and the cooling module (4) being shaped such that there is a stepped interface between them. The cooling module (4) comprises a metal block having channels therein through which coolant circulates when the cooling module (4) is in use. The apparatus further comprises refluxing means (5) which are positioned above the heat transfer block (30) and arrayed annularly around a central hole (52), whereby the cooling module (4) can be inserted or removed from the heat, transfer block (30) through the hole (52) without disturbance or removal of the said reaction vessels (36) or refluxing means (5). In an alternative embodiment, the cooling module may be annular with a central recess for receiving the heat transfer block.

6 Claims, 7 Drawing Sheets

MULTI-STATION REACTION APPARATUS

The present patent application is a non-provisional application of International Application No. PCT/GB2004/002265, filed 26 May 2004.

The present invention relates to multi-station reaction apparatus.

In order to be able to carry out a plurality of chemical reactions simultaneously a multi-station reaction apparatus is commonly used. Such apparatus comprises a plurality of cells, formed in an array, into each of which a reaction vessel can be inserted.

In apparatus intended for the use of an individual, where parallel synthesis on a relatively small scale is required, there are typically 12 or 24 cells in the array which are heated or cooled together, and means are provided for stirring the contents of each reaction vessel simultaneously. Means for refluxing the contents of each reaction vessel are also provided.

In multi-station reaction apparatus known from WO 99/13988, twelve cavities are formed in a ring around a circular metal heat transfer block which is adapted to fit onto an existing stirrer/heater device, whereby the contents of reaction vessels located in the cavities may be stirred and heated. The apparatus has a refluxing/inerting head comprising a circular metal body fitted over the top of each reaction vessel, through which body coolant circulates so as to bring about refluxing of the contents of the reaction vessels. In the centre of the upper surface of the body a gas inlet and a plurality of gas outlets are provided for introducing inert gas into the reaction vessels through respective-vessel caps. If the contents of the reaction vessels are to be cooled in this apparatus it is necessary to lift the reaction vessels and refluxing/inerting head, remove the heat transfer block, replace the heat transfer block with an annular tray containing ice and insert the bottoms of the reaction vessels into the ice.

It is desirable to provide means by which the contents of reaction vessels in such apparatus can be cooled more easily.

According to a first aspect of the present invention there is provided a multi-station reaction apparatus comprising a heat transfer block, formed with a plurality of cavities for receiving respective reaction vessels, and a removable cooling module, characterised in that the heat transfer block and removable cooling module are such that the removable cooling module is either housed within a central recess formed in the upper surface of the heat transfer block, around which recess the plurality of cavities are arrayed, or shaped so as to have a central recess within which the heat transfer block is located when the cooling module is in use.

According to a second aspect of the present invention there is provided a multi-station reaction apparatus comprising a heat transfer block and a removable cooling module, the cooling module comprising a metal block having channels therein through which coolant circulates when the cooling module is in use. Preferably, the cooling module has a central recess shaped for locating the heat transfer block within the recess. In this way the need for an ice tray is avoided.

Alternatively, the heat transfer block may surround the cooling module.

According to a third aspect of the present invention, there is provided a multi-station reaction apparatus comprising a heat transfer block formed with a plurality of cavities for receiving respective reaction vessels, wherein the upper surface of the heat transfer block has a central recess around which the said plurality of cavities are arrayed. Preferably, the heat transfer block is annular and the apparatus further comprises a removable cooling module, the central recess of the heat transfer block being shaped so as to accommodate the said removable cooling module. This arrangement allows efficient heat transfer to take place between the heat transfer block and cooling module.

It is desirable, in order to allow the cooling module to positively locate vertically within the heat transfer block whilst providing sufficient lateral movement at the interface between them to accommodate thermal expansion and contraction, for corresponding surfaces of the central recess of the heat transfer block and the cooling module to be shaped such that there is a stepped interface between them. To avoid the use of ice containers, the cooling module preferably comprises a metal block having channels therein through which coolant circulates when the cooling module is in use.

The apparatus further comprises refluxing means for bringing about refluxing of the contents of reaction vessels used in the apparatus, which refluxing means are positioned above the heat transfer block and arrayed annularly around a central hole, whereby the said cooling module can be inserted or removed from the said heat transfer block through the said hole without disturbance or removal of the said reaction vessels or refluxing means.

According to a fourth aspect of the present invention, there is provided a heat transfer block for use in a multi-station reaction apparatus, wherein the upper surface of the heat transfer block has a central recess around which cavities are formed in the heat transfer block for receiving respective reaction vessels. In a preferred embodiment the heat transfer block is annular and the central recess is shaped so as to receive a removable cooling module. The combination of an annular heat transfer block fitted with a circular cooling module allows efficient heat transfer to take place between the heat transfer block and cooling module. In order to allow the cooling module to positively locate vertically within the heat transfer block whilst providing sufficient lateral movement at the interface between them to accommodate thermal expansion and contraction, the recess in the heat transfer block preferably has a stepped surface corresponding in shape to a stepped surface of the said cooling module. In this way the cooling module does not jam in the heat transfer block during cooling and can serve as an efficient heat transfer block cooling device.

According to a fifth aspect of the present invention, there is provided a removable cooling module for use with a heat transfer block embodying the third aspect of the present invention, the cooling module comprising a metal block having channels therein through which coolant circulates when the cooling module is in use. The provision of such a removable cooling module, located centrally, avoids the need to provide ice containers to cool the reaction vessels and allows the cooling module to be inserted into and removed from the heat transfer block easily whilst the reaction vessels are still in position in the heat transfer block.

Alternatively, according to a sixth aspect of the present invention, there is provided a removable cooling module for use in a multi-station reaction apparatus having a heat transfer block, which cooling module has a central recess shaped for locating such a heat transfer block within the said recess. Preferably, the said cooling module is annular.

As a further alternative, according to a seventh aspect of the present invention there is provided a combination for use in a multi-station reaction apparatus comprising a heat transfer block and a cooling module, wherein the heat transfer block and cooling module are formed integrally with one another. Preferably, the cooling module is located centrally within the heat transfer block. Alternatively, the heat transfer block is located centrally within the said cooling module. The cooling module desirably comprises a metal block having channels therein through which coolant circulates when the cooling module is in use.

According to an eighth aspect of the present invention there is provided a multi-station reaction apparatus including such a heat transfer block and cooling module combination.

Reference will now be made, by way of example, to the accompanying drawings, in which:—

Figure 1:
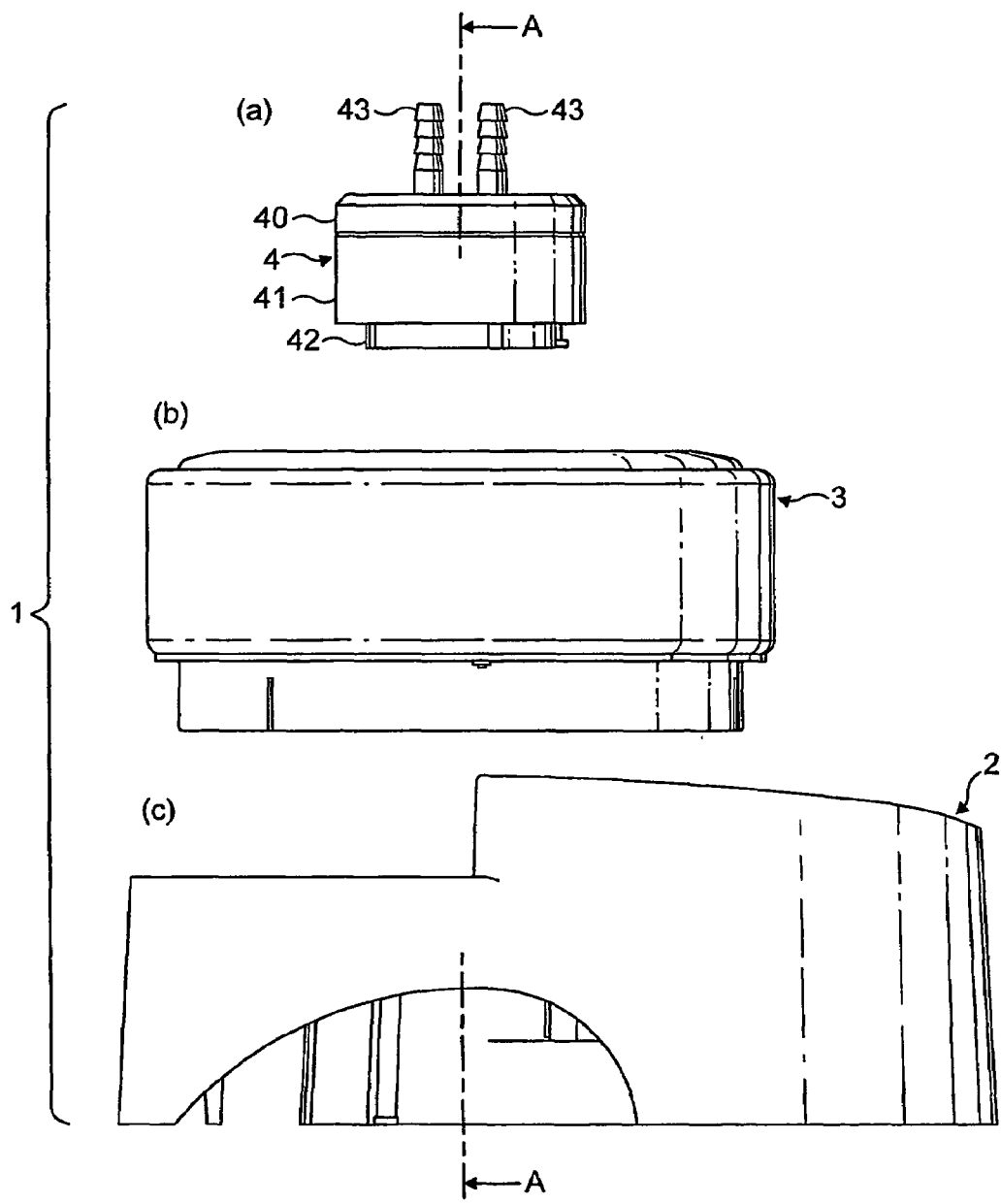
FIG. 1 shows exploded elevational views of multi-station reaction apparatus embodying the present invention.
Figure 2:
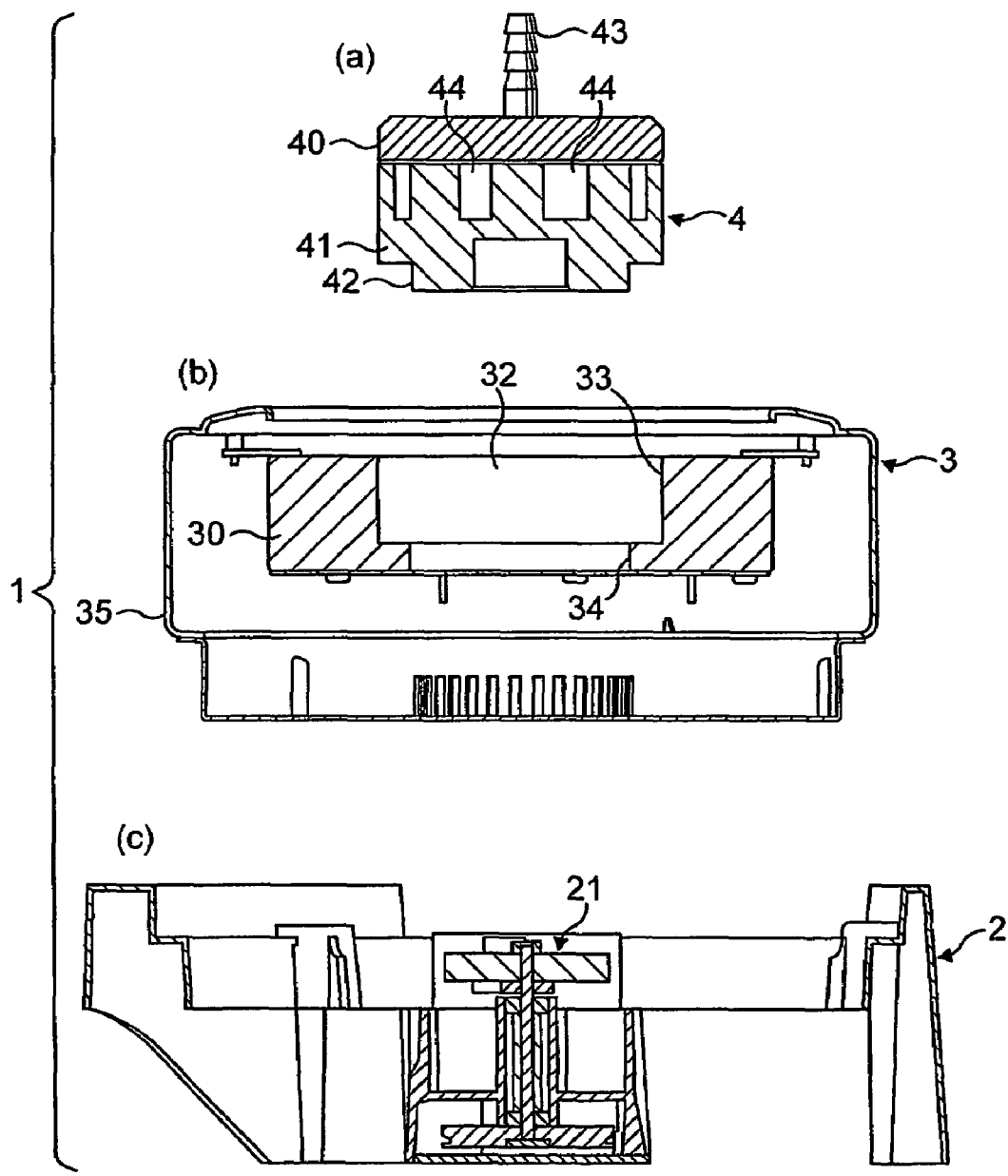
FIG. 2 shows cross-sectional views taken on line A-A in FIG. 1.

As shown in the accompanying Figures, multi-station reaction apparatus 1 embodying the present invention comprises a base unit 2, a heating module 3, a cooling module 4 and a refluxing head 5.

Base unit 2 contains a magnetic stirring mechanism 21 for use in stirring the contents of reaction vessels 36 in the apparatus 1. The base unit 2 also contains control mechanisms (not shown) for controlling the apparatus 1.

Heating module 3 comprises an annular heat transfer block 30 containing electrical heating cartridges (not shown) for heating the contents of reaction vessels 36 used in the apparatus 1. When in use the reaction vessels 36 are located within machined cavities 31 formed in a ring around a central recess 32 provided in the heat transfer block 30. The heat transfer block 30 is housed within a casing 35 within which there is bottom-to-top convection cooling.

The central recess 32 in the heat transfer block 30 has a vertical face 33 formed with a step 34 at its lower portion. The recess 32 is provided for accommodating the cooling module 4. Cooling module 4 comprises a machined circular metal body 40 having channels 44 running through it for the circulation of coolant which enters and leaves the cooling module 4 via barbed inlet and outlet ports 43. The cooling module 4 is controllable independently of the heat transfer block 30. The body 40 of the cooling module 4 has a vertical face 41 formed with a step 42 at its lower portion. Thus, recess 32 in the heat transfer block 30 and cooling module 4 have mating stepped heat transfer surfaces which allow the cooling module 4 to positively locate vertically within the heat transfer block 30 whilst providing sufficient lateral movement at the interface between them to accommodate thermal expansion and contraction. In this way the cooling module 4 does not jam in the heat transfer block 30 during cooling and can serve as an efficient heat transfer block cooling device.

Figure 3A:
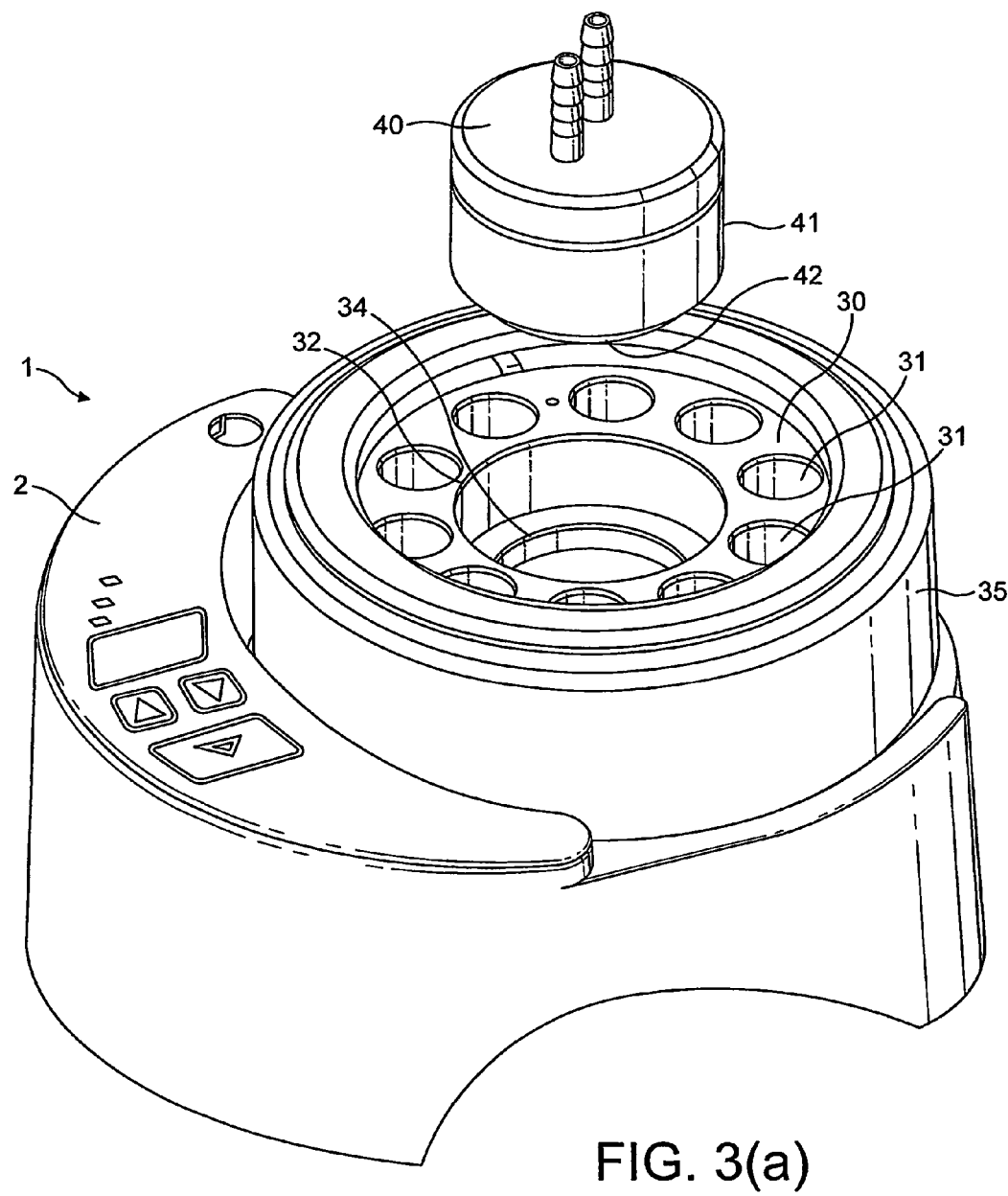
FIG. 3 shows perspective views of parts of the apparatus of FIG. 1.
Figure 3B:
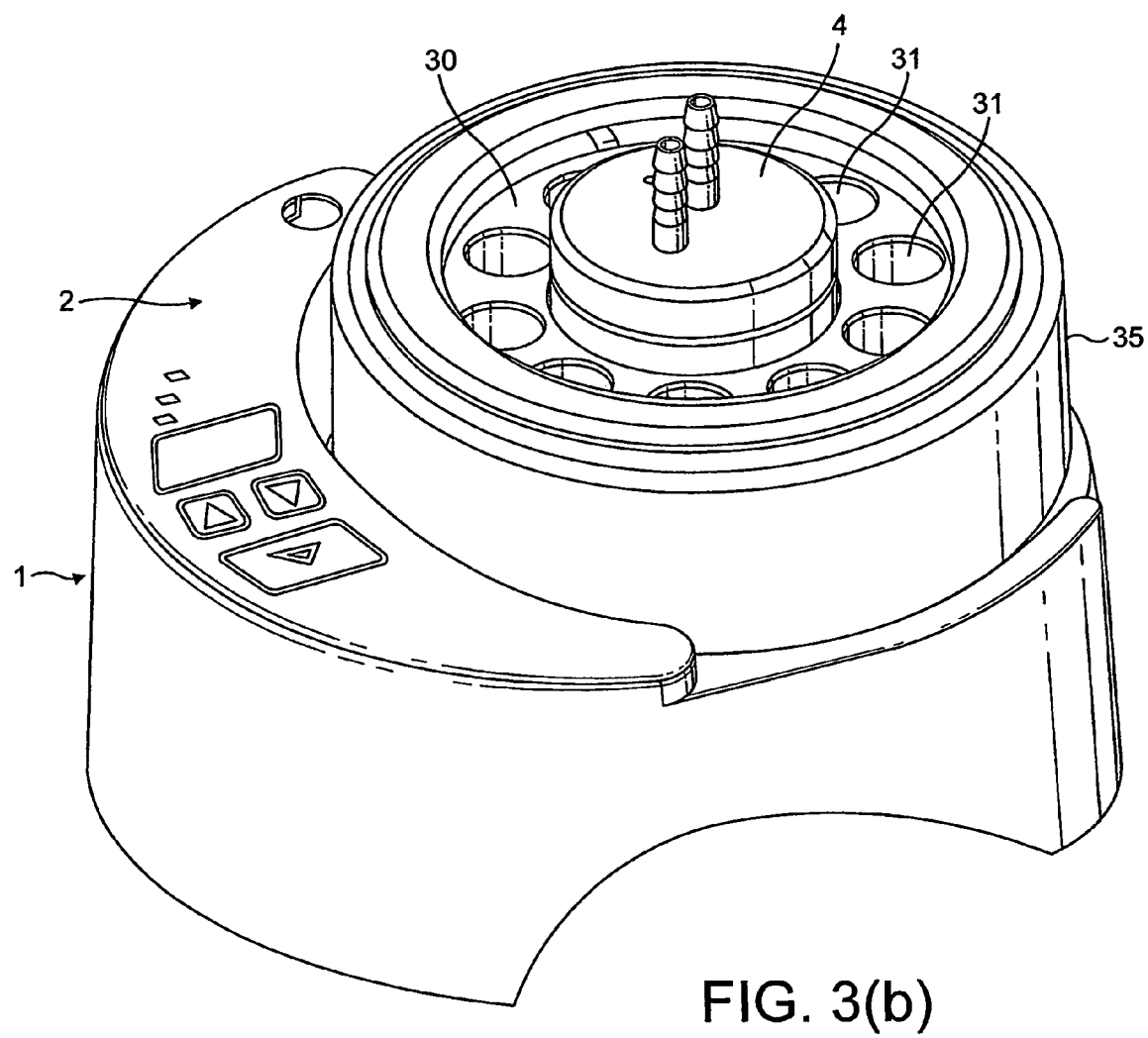
Figure 4A:
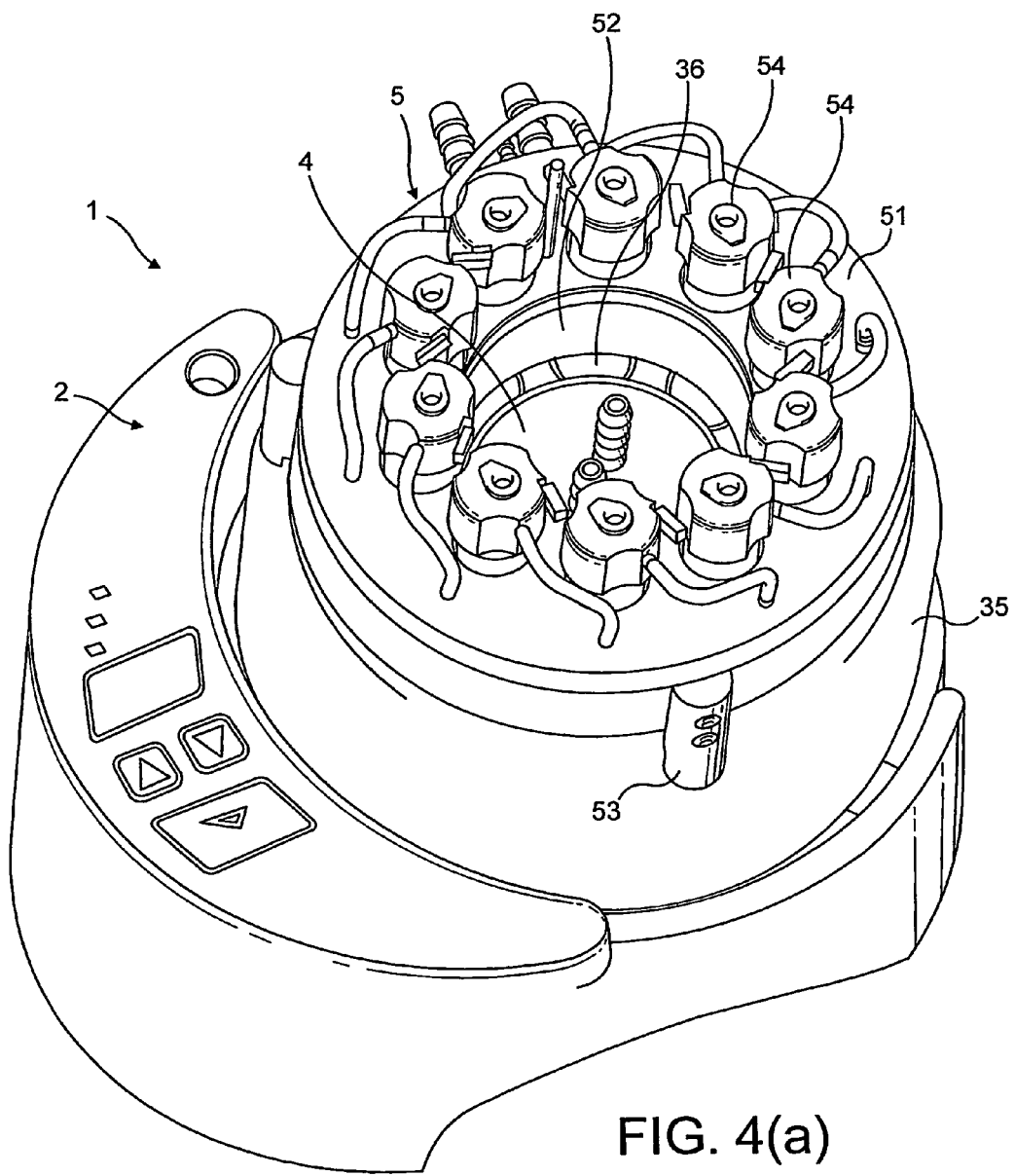
FIG. 4 shows perspective views of further parts of FIG. 1.
Figure 4B:
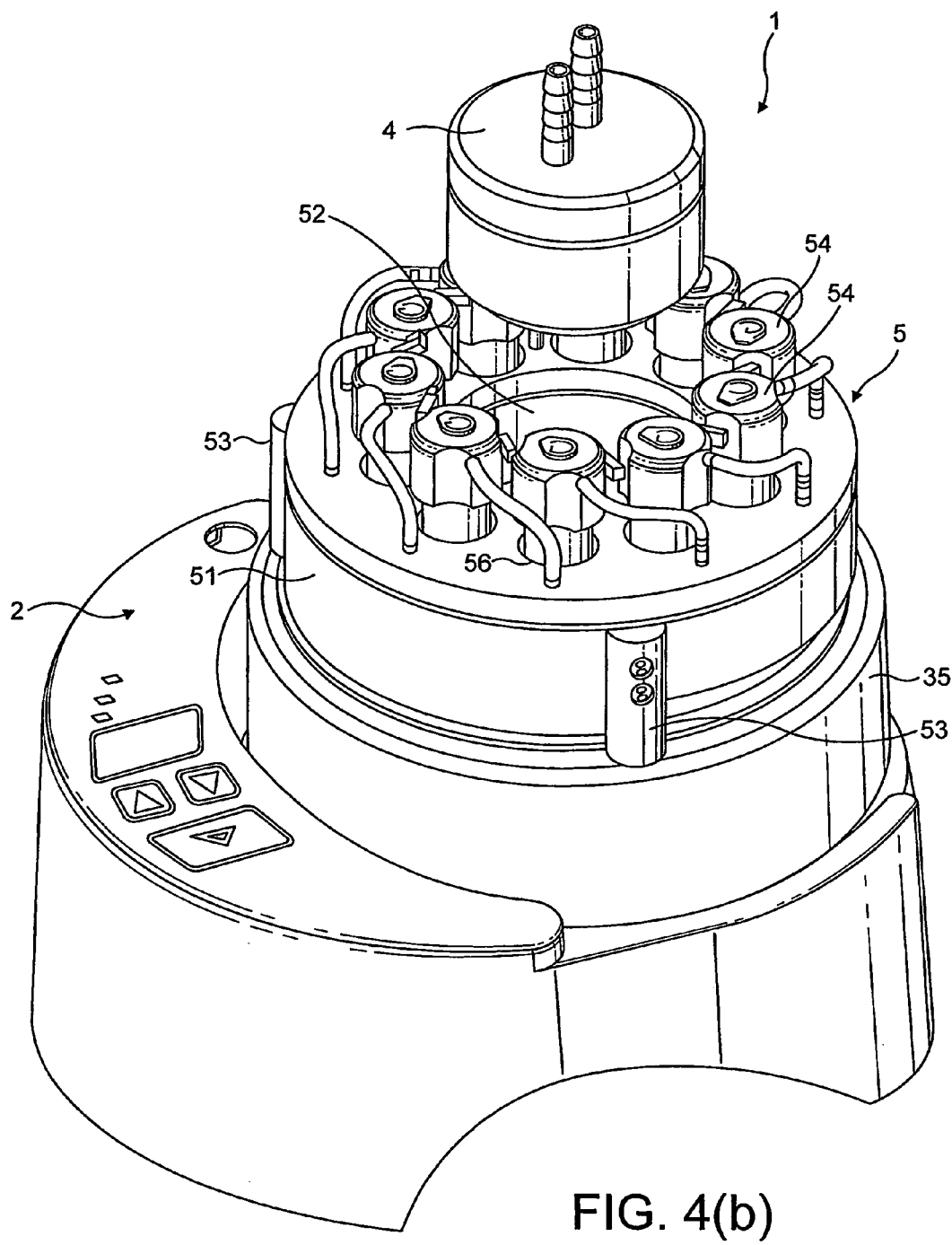

FIG. 3 shows the heating module 3 on the base unit 2, FIG. 3(a) showing the cooling module 4 as it is being inserted into the recess 32 in the heat transfer block 30 and FIG. 3(b) showing the cooling module 4 when located in the recess 32. The apparatus 1 also has the advantage that the cooling module 4 can be readily inserted into and removed from the heat transfer block 30 without the need to disturb or remove the refluxing means 5 and reaction vessels 36, as shown in FIG. 4. Refluxing means 5 comprise an annular body 51 through which coolant is circulated for bringing about refluxing of the contents of reaction vessels 36, the upper portions of which vessels 36 extend through respective apertures 56 arranged in a ring about a central hole 52 in the body 51. FIG. 4(a) shows the cooling module 4 located in the recess 32 in the heat transfer block 30. As shown in FIG. 4(b) the cooling module 4 can be easily removed from the apparatus 1 through the hole 52 provided in the annular body 51 of the refluxing means 5. The body 51 of the refluxing means 5 is mounted on the casing 35 of the heating module 3 by means of pillars 53. Inerting gas can also be supplied to the reaction vessels 36 via vessel caps 54.

Figure 5:
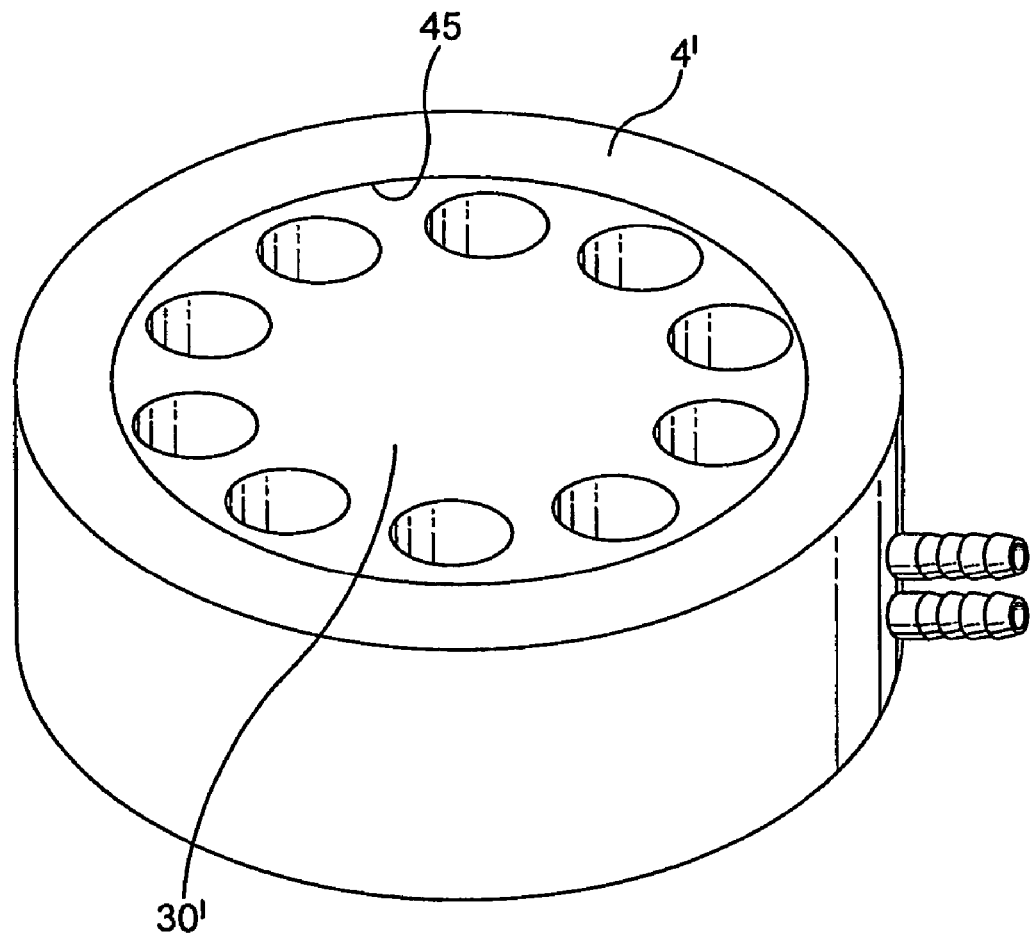
FIG. 5 shows a view of an alternative embodiment of the present invention.

Alternative arrangements may be contemplated in which the use of an ice tray may be avoided. For example, as illustrated in FIG. 5, the multi-station reaction apparatus may instead comprise a heat transfer block 30' and a removable cooling module 4' in which the cooling module 4' has a central recess 45 shaped for locating the heat transfer block 30' within the recess 45.

In another example the heat transfer block and cooling module may be formed integrally with one another, such that either the cooling module is located centrally within the heat transfer block or the heat transfer block is located centrally within the said cooling module. The heat transfer block and cooling module are controllable separately to heat/cool the reaction vessels as required.

The invention claimed is:

1. A multi-station reaction apparatus (1) comprising a heat transfer block (30; 30'), formed with a plurality of cavities (31) for receiving respective reaction vessels (36), for transferring heat to and from the reaction vessels (36) collectively, and a removable cooling module (4; 4'), characterised in that the heat transfer block (30; 30') and removable cooling module (4; 4') are such that the removable cooling module (4) is either housed within a central recess (32) formed in the upper surface of the heat transfer block (30), around which recess (32) the plurality of cavities (31) are arrayed, or shaped so as to have a central recess (45) within which the heat transfer block (30') is located when the cooling module (4') is in use.

2. Apparatus as claimed in claim 1, wherein the said cooling module (4) comprises a metal block (40) having channels (44) therein through which coolant circulates when the cooling module (4) is in use.

3. Apparatus as claimed in claim 1, wherein when in use the removable cooling module (4) is housed within the recess (32) in the heat transfer block (30), which heat transfer block (30) is annular.

4. Apparatus as claimed in claim 3, wherein corresponding surfaces of the central recess (32) of the heat transfer block (30) and the exterior of the cooling module (4) are shaped such that there is a stepped interface (34, 42) between them.

5. Apparatus as claimed in any one of claims 2 to 4, further comprising refluxing means (5) for bringing about refluxing of the contents of reaction vessels (36) used in the apparatus (1), which refluxing means (5) are positioned above the heat transfer block (30) and arrayed annularly around a central hole (52), whereby the said cooling module (4) can be inserted or removed from the said heat transfer block (30) through the said hole without disturbance or removal of the said reaction vessels (36) or refluxing means (5).

6. Apparatus as claimed in claim 1, wherein the removable cooling module (4') has a central recess (45) for locating the heat transfer block (30'), which cooling module (4') is annular.

* * * * *